United States Patent [19]

Gassmann et al.

[11] Patent Number: 5,284,305
[45] Date of Patent: Feb. 8, 1994

[54] CASSETTE FOR WINDING UP PHOTOGRAPHIC STRIP MATERIAL

[75] Inventors: Werner Gassmann, Dänikon; Albert Dünner, Zürich; Erich G. Binder, Buchs, all of Switzerland

[73] Assignee: Gretag Systems, Inc., Bothell, Wash.

[21] Appl. No.: 723,052

[22] Filed: Jun. 28, 1991

[30] Foreign Application Priority Data

Jun. 29, 1990 [CH] Switzerland .................. 2174/90

[51] Int. Cl.$^5$ ............................................. B65H 18/02
[52] U.S. Cl. ..................... 242/67.1 R; 242/55.53; 242/68.4; 242/68.5
[58] Field of Search .............. 242/67.1 R, 67.3 R, 242/68, 68.1, 68.2, 68.3, 68.4, 68.5, 55.53, 76, 195, 197, 198; 352/157, 158; 355/72, 75; 403/13, 19, 328, 354

[56] References Cited

U.S. PATENT DOCUMENTS

| | | | |
|---|---|---|---|
| 3,917,185 | 11/1975 | Canada et al. | 242/68.5 |
| 4,010,912 | 3/1977 | Dreher et al. | 242/67.1 R |
| 4,042,185 | 8/1977 | Risse | 242/71.1 X |
| 4,111,379 | 9/1978 | Luscher | 242/71.1 |
| 4,171,781 | 10/1979 | Kral et al. | 242/68.2 X |
| 4,330,096 | 5/1982 | Bartel et al. | 242/74.1 |
| 4,358,039 | 11/1982 | Buzzell | 242/68 X |
| 4,441,667 | 4/1984 | Bartel et al. | 242/197 |
| 4,466,579 | 8/1984 | Nitsch et al. | 242/67.1 |
| 4,494,706 | 1/1985 | Becherer et al. | 242/65 |
| 4,504,026 | 3/1985 | Serizawa et al. | 242/67.1 R X |
| 4,544,110 | 10/1985 | Nagel et al. | 242/67.1 R |
| 4,566,785 | 1/1986 | Takenouchi | 242/55.53 X |
| 4,741,439 | 5/1988 | Bizic | 242/55.53 X |

FOREIGN PATENT DOCUMENTS

| | | |
|---|---|---|
| 0362780 | 10/1989 | European Pat. Off. . |
| 2939430 | 9/1979 | Fed. Rep. of Germany . |
| 3034081 | 9/1980 | Fed. Rep. of Germany . |
| 3116041 | 4/1981 | Fed. Rep. of Germany . |
| 2846953 | 10/2778 | Fed. Rep. of Germany . |
| 2625737 | 7/1989 | France .................. 242/67.1 R |
| 466713 | 12/1466 | Sweden . |
| 359972 | 8/1958 | Sweden . |

Primary Examiner—Joseph J. Hail, III
Assistant Examiner—John P. Darling
Attorney, Agent, or Firm—Burns, Doane, Swecker & Mathis

[57] ABSTRACT

The cassette comprises two pivotable guide members (6,7) which guide the photographic strip material (B) round a hollow cylindrical guide sleeve (5) which can be slipped onto a rotatably mounted, drivable winding core (4) and, on being slipped onto that winding core, locks into its operating position.

20 Claims, 4 Drawing Sheets

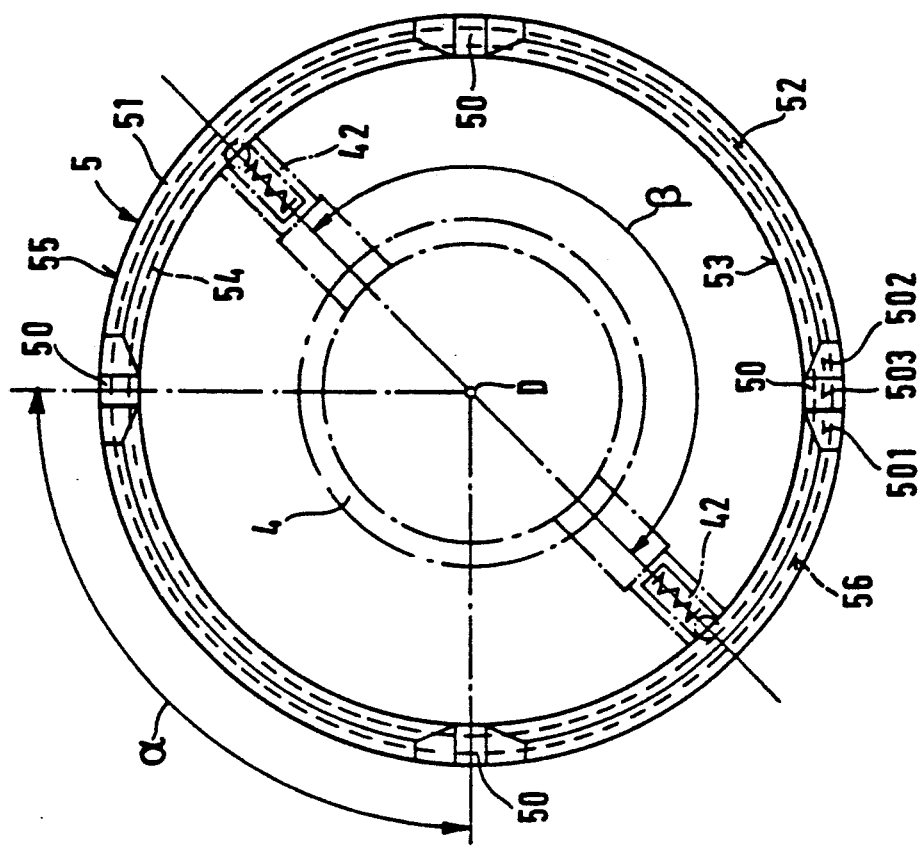
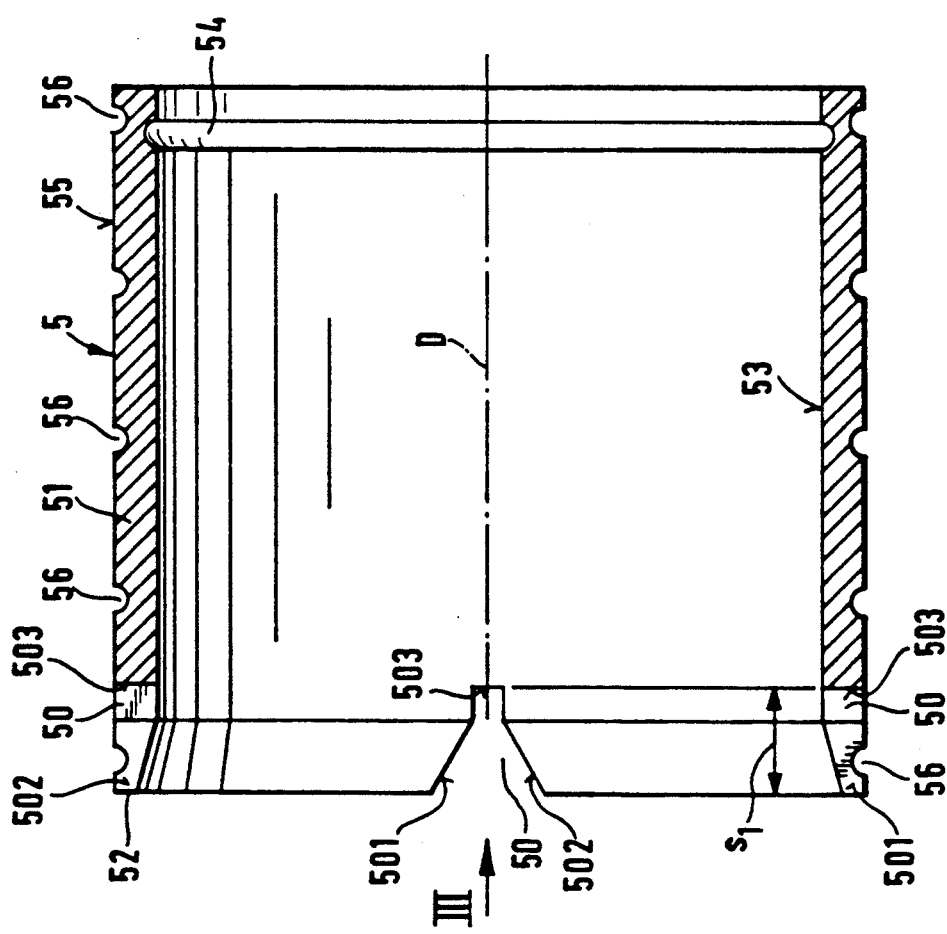

CASSETTE FOR WINDING UP PHOTOGRAPHIC STRIP MATERIAL

BACKGROUND OF THE INVENTION

The invention relates to a cassette for winding up photographic strip material.

Such cassettes are known in many forms. They are used especially in photographic laboratories in conjunction with copying apparatuses that are automated to a greater or lesser degree and to which they can be coupled in a light-tight manner so that strip material to be wound up, for example exposed photographic paper, can be fed directly to the cassette. The publications DE-OS 2 846 953, DE-OS 3 048 727, DE-OS 3 116 041 and DE-OS 2 939 430 disclose various such types of cassette in the case of which the photographic paper to be wound up is wound onto a winding coil using various means. In the case of the cassettes described in those publications, however, no details are given of the mounting and dismounting of the winding core, or of the slipping on and securing of a sleeve onto which the photographic paper is wound.

A further such cassette is known from DE-PS 3 150 495. In the case of the cassette described in that publication, the strip material to be wound up is wound onto an exchangeable spool component which seats on a rotatably mounted receiving arbor. A pasteboard core having the desired outside diameter can be slipped onto the cylindrical body of the spool component. Provided on both sides of the pasteboard core are flanges which are supported by external rings on the pasteboard core. Those external rings can be connected securely to the cylindrical body of the spool component so that the guiding of the pasteboard core is ensured by the flanges. Such a cassette has the disadvantage that, when winding round the pasteboard core, the friction between the surface of the pasteboard core and the strip material is often insufficient when the strip material is wound up to avoid air gaps being formed between the individual layers of the strip material wound round the pasteboard core. Means that constantly press the strip material against the winding core are not, however, mentioned in that publication. It is also a considerable disadvantage that, when exchanging such a spool component, for example when a winding core has been completely filled with strip material, it is always necessary to exchange the whole spool component with the slipped-on pasteboard core and to insert a new spool component with a pasteboard core placed thereon. In addition, for further processing of a completely full pasteboard core, the latter has also first to be taken off the cylindrical body of the spool component unless there is provided in the downstream processing station a receiving means that is tailored exactly to the dimensions of the receiving arbor on which the spool component seats with the pasteboard core. That entails an additional operation and thus greater use of resources.

Another such cassette is known from DE-PS 3 034 081. In the case of the cassette described in that publication, the strip material to be wound up is guided in a strip channel formed by a link chain which extends round a pasteboard core. Fitted to the end of that link chain is a carrier lever that is rotatable about an axis and on the other lever arm end of which is fitted a roller that presses the strip material to be wound up against the pasteboard core or the strip material already wound onto that pasteboard core. The pasteboard core itself is slipped onto a rotatably mounted hexagonal core. The disadvantage of that cassette is on the one hand that, when exchanging a full pasteboard core, first the link chain which lies around and against the coil, has to be moved away or detached in order to be able to remove the pasteboard core from the rotatable hexagonal core. Furthermore, the slipping on and removal of the pasteboard core is not very easy since the pasteboard core has to seat securely on the hexagonal core in order to be satisfactorily carried along with the rotational movement of the hexagonal core. If, on the other hand, the pasteboard core seats only loosely on the hexagonal core, then it may happen that it is not satisfactorily carried along with the rotational movement of the hexagonal core and thus a build-up of strip material may occur in the cassette since the winding-up operation is interrupted for the period in which the hexagonal core does not carry the pasteboard core along but the strip material continues to be fed into the cassette. On the one hand, therefore, it is essential for the pasteboard core to seat securely but, on the other hand, the core is also to be readily exchangeable.

SUMMARY OF THE INVENTION

The problem of the invention is accordingly to permit easy mounting and dismounting of the core or sleeve onto which the strip material can be wound and at the same time to ensure that the core or sleeve seats securely during the winding-up operation. The machinery involved is to be as simple as possible.

That problem is solved by the invention. Especially advantageous forms of the invention can be gathered from the following description of preferred embodiments.

BRIEF DESCRIPTION OF THE DRAWINGS

Other objects and advantages of the present invention will become more apparent from the following detailed description of preferred embodiments described in conjunction with the accompanying drawings, wherein like elements have been assigned like numerals and wherein:

FIG. 2 shows the guide sleeve of the cassette of FIG. 1

FIG. 3 shows a view of one end of the guide sleeve of FIG. 2

DETAILED DESCRIPTION OF THE PREFERRED EMBODIMENTS

Figure 1:
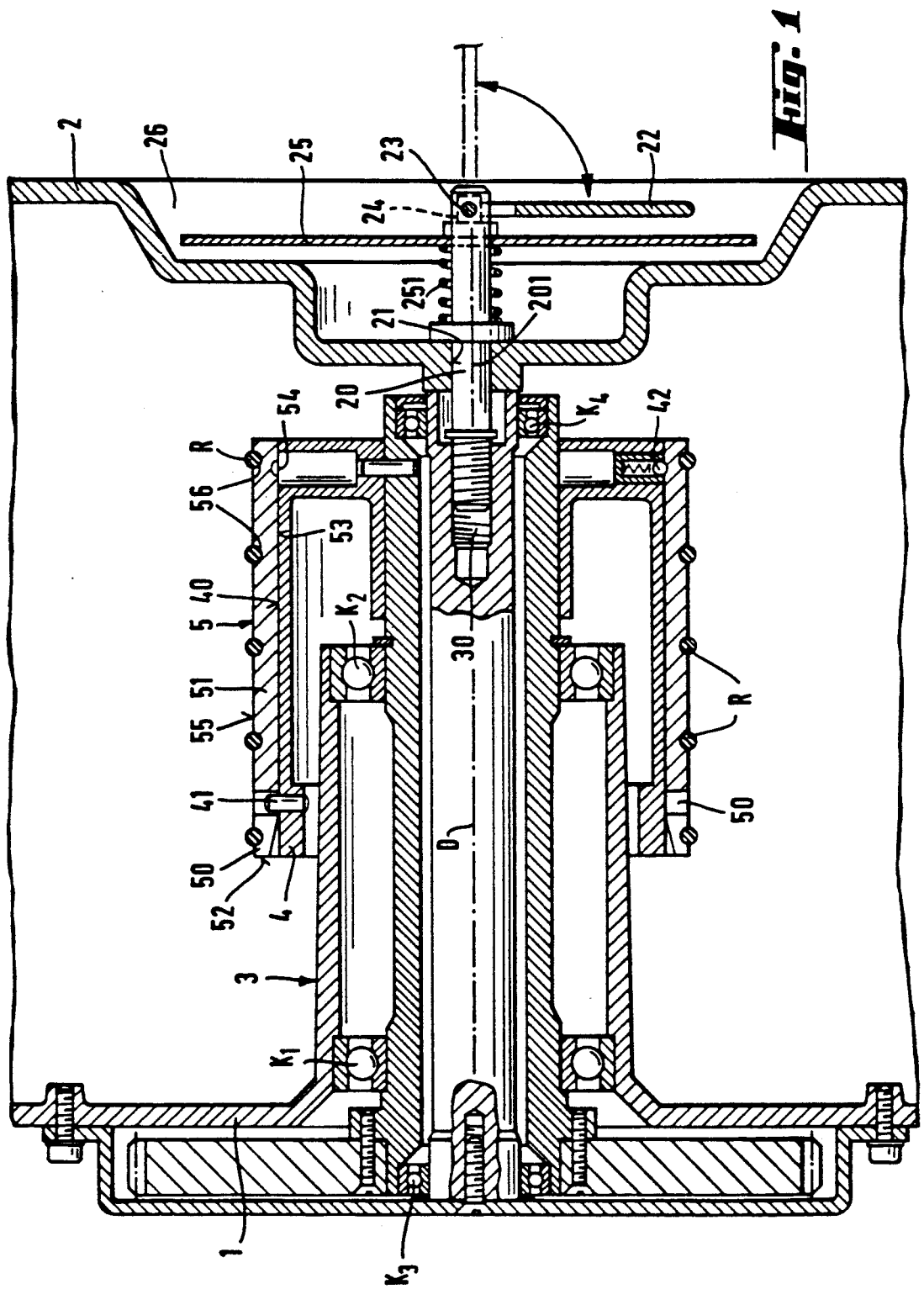
FIG. 1 shows part of an embodiment of a cassette according to the invention

FIG. 1 shows a partial view of an embodiment of a cassette according to the invention in cross-section. This partial view is intended to show, in particular, how the sleeve onto which the photographic strip material is wound is placed on the winding core. 1 and 2 indicate two end plates of the housing, 3 indicates a bearing arbor, 4 indicates a winding core which comprises several parts which are connected to one another and which is rotatably mounted on the bearing arbor 3 by means of ball bearings $K_1$, $K_2$, $K_3$ and $K_4$. Placed on the winding core 4 is a hollow cylindrical guide sleeve 5 having on its outer wall a number of circumferential grooves 56, here, for example, five grooves 56, in each of which is inserted an O-shaped ring R, the surface of which has a high coefficient of friction. To improve clarity, the light-tight casing connecting the end plates 1 and 2, and the pivotable guide members guiding the photographic strip material round the guide sleeve have not been shown in FIG. 1. They are dealt with in more detail hereinafter.

An embodiment of the guide sleeve 5 of the cassette according to the invention is now to be explained in more detail with reference to FIG. 2, the partial view in FIG. 1, which shows how the guide sleeve 5 seats in its operating position on the winding core 4, being discussed at suitable points in the explanation. In FIG. 2, the guide sleeve 5 is shown in longitudinal section. If the sleeve 5 is viewed in the direction in which it is slipped onto the winding core 4 (FIG. 1), thus from the right in FIG. 2, it has in its rear end region, thus on the left in FIG. 2, a groove 50 that penetrates the wall 51 of the guide sleeve 5 and extends parallel to the axis of rotation D into the sleeve. The manner in which that groove 50 is formed is shown clearly in the middle of the rear end of the sleeve (thus in the middle on the left in FIG. 2). The groove 50 has two converging faces 501 and 502 and a slot 503 following on therefrom. When the sleeve 5 is slipped onto the winding core 4, the converging faces 501 and 502 facilitate the sliding of a pin 41 of the winding core 4 (FIG. 1) into the slot 503 of the sleeve. The pin 41 projects radially outwards from the outer wall 40 of the winding core 4 in the rear end region of the latter (thus on the left in FIG. 1). So that the sleeve 5 can be slipped fully onto the winding core 4, the groove 50 must extend into the sleeve 5 (thus towards the right in FIG. 2) by at least the same distance $s_1$ as the pin 41 (FIG. 1) is arranged away from the rear end 52 of the sleeve 5. As can be seen from a side view onto the rear end of the sleeve 5 (FIG. 3), four grooves 50, which are offset with respect to one another by the angle $\alpha = 90°$, are provided in this embodiment. This ensures that, when the sleeve 5 is slipped onto the winding core 4, the sleeve has to be turned through an angle of no more than 90° until one of the grooves 50 lies opposite the pin 41 in such a manner that the sleeve 5 can be slipped fully onto the winding core 4. In order to reduce still further the maximum angle through which the sleeve 5 has to be turned when it is slipped on, n different grooves 50 which are offset with respect to one another by the angle $\alpha = 360°/n$ can be provided on the sleeve 5.

The sleeve 5 also has in its front end region (thus on the right in FIG. 2) a circumferential groove 54 on its inner wall 53. As a counterpart to that groove 54, there are provided in the front end region of the winding core 4 two ball pressure pieces 42 which lock into the groove 54 when the sleeve 5 is slipped onto the winding core 4. Once the ball pressure pieces 42 are locked into the groove 54, the sleeve 5 is secured both against lateral turning (by the pin 41 which engages in the groove 50) and against displacement in the direction of the axis of rotation D (by the ball pressure pieces 42 locked into the groove 54) and is accordingly ready for the operation of the cassette. In order to improve still further the seat of the sleeve 5 on the winding core 4, m ball pressure pieces 42 can be provided on a circumference in the front end region of the winding core 4. It should be emphasised, however, that just a single ball pressure piece alone ensures a secure seat for the sleeve 5 on the winding core 4. If m ball pressure pieces 42 are provided, it is advantageous if they are generally arranged so that they are offset with respect to one another by an angle $\beta = 360°/m$. The sleeve 5 can be pulled off the winding core 4 again in the same easy manner in which it is slipped on. The resistance with which the ball pressure piece 42 opposes this withdrawal of the sleeve 5 from the winding core 4 after locking into the groove 54 must of course be overcome. This simple mechanism ensures that the sleeve 5 seats securely on the winding core 4 when the cassette is in operation, while at the same time ensuring that it is possible to mount and dismount or exchange the sleeve in a very simple and convenient manner.

As is also shown in FIGS. 1 and 2, the outer wall 55 of the guide sleeve 5 has a number of grooves 56 running round the circumference into each of which is inserted an O-shaped ring R, the surface of which has a high coefficient of friction. The photographic strip material which is guided round the guide sleeve 5 by means of the guide members adheres to those rings R and is thus wound round the sleeve 5.

Figure 4:
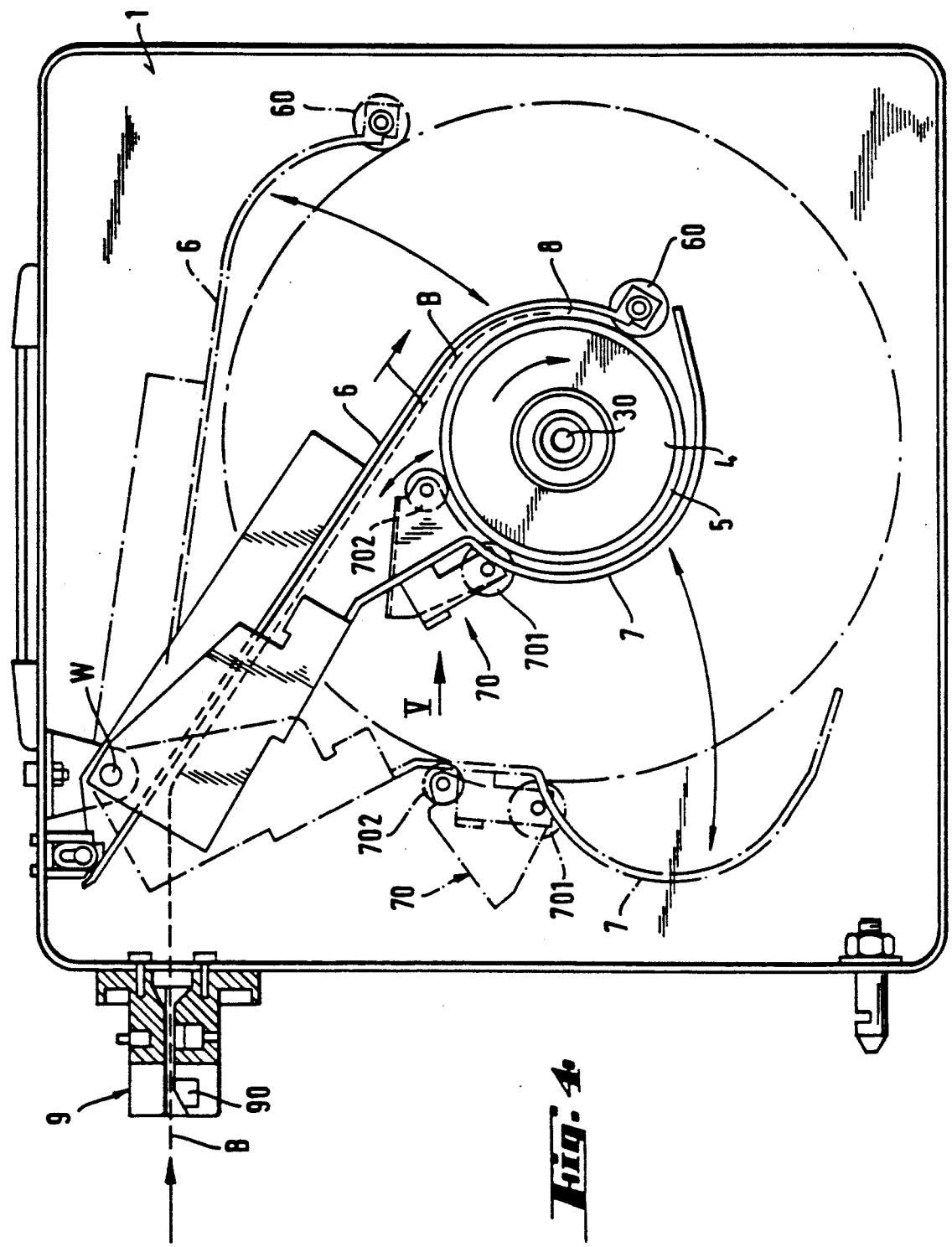
FIG. 4 shows a view of an opened cassette

FIG. 4 shows a view of an opened cassette. For the sake of simplicity, only the two guide members 6 and 7 are shown in the inner chamber of the cassette since their mode of operation is to be explained with reference to this Figure. The two guide members 6 and 7, the upper guide member being indicated by 6 and the lower guide member being indicated by 7, are arranged to pivot about a common shaft W. It can be seen that they define a narrow channel 8 for the strip, which channel extends in the region of the winding core 4 with the slipped-on sleeve 5 substantially completely round the guide sleeve 5 and at a slight distance therefrom. The upper guide member 6 guides the strip material substantially round the upper half and the lower guide member guides the strip material substantially round the lower half of the guide sleeve. In a first state, in which no strip material has yet been wound onto the guide sleeve 5, the two guide members 6 and 7 run substantially along an axis that, relative to the position of the cassette when in use, points approximately in the "ten minutes to four" direction. When the photographic strip material B (broken line) reaches the area of the winding core 4 with the slipped-on guide sleeve 5, it is guided round the sleeve in the strip channel 8 and, owing to the friction, adheres to the outer wall 55 of the sleeve 5 (see in this connection the explanation of FIG. 2) or to the O-shaped rings R of the sleeve. As the winding core 4 with the slipped-on sleeve 5 continues to rotate, the strip material B reaches the end of the upper guide member 6 facing the sleeve 5 where it is pressed by a roller 60 provided there against the outer wall 55 of the sleeve 5. That roller 60, in the first state, in which no strip material has yet been wound on, is arranged approximately in the "four o'clock" position relative to the position of the cassette when in use. As it progresses further, the strip material B passes through the strip channel 8, after approximately half a rotation of the winding core, to a position at which a pressure roller component 70 is provided on the lower guide member 7, which pressure roller component likewise presses the strip material against the outer wall 55 of the guide sleeve 5. That pressure roller component 70, the design of which will be discussed in more detail below, is, in the first state, in which no strip material has yet been wound on, arranged approximately between the "ten o'clock" position and the "eleven o'clock" position, relative to the position of the cassette when in use. The pressure roller component 70 comprises two rollers 701 and 702 which press the strip material against the outer wall 55 of the guide sleeve. The roller component 70 is pivotable about the shaft of the rear roller 701. In order to be able to pivot the roller component, there is provided in the lower guide member 7 a cutout 71 (shown in FIG. 5) through which the roller component 70 can be pivoted. Once a few layers of the strip material B have been wound onto the sleeve 5, the coil of strip material B presses the roller 60 away in the outward direction and, accordingly, the upper guide member 6 substantially upwards. At the same time, the coil of strip material B presses the rear roller 701 of the pressure roller component 70 away in the outward direction, whereby the lower guide member 7 is pivoted substantially downwards about the shaft W. So that the roller component 70 can continue to press the strip material B against the guide sleeve or against the outermost layer of the strip material B that has already been wound on, means are provided that cooperate with the lower guide member 7 in such a manner that both rollers 701 and 702 of the roller component 70 always press against the outermost layer of the wound-on strip material B. For example, those means may comprise a spring (not shown) that is so arranged that it pulls or pushes the lower guide member 7 in such a manner that the rear roller 701 of the roller component 70 always rests on the outermost layer of the strip material B. Further springs 703 and 704 (not shown in FIG. 4) of the roller component 70 (FIG. 5) ensure that the front roller 702 always remains pressed against the outermost layer of the wound-on strip material B. When the winding-up operation has been completed, the sleeve 5 can be pulled off the winding core 4 in the simple manner already described above merely by folding back the roller component 70 by hand and by pivoting the two guide members 6 and 7 out of the way, and a new sleeve 5 can be slipped on.

Figure 5:
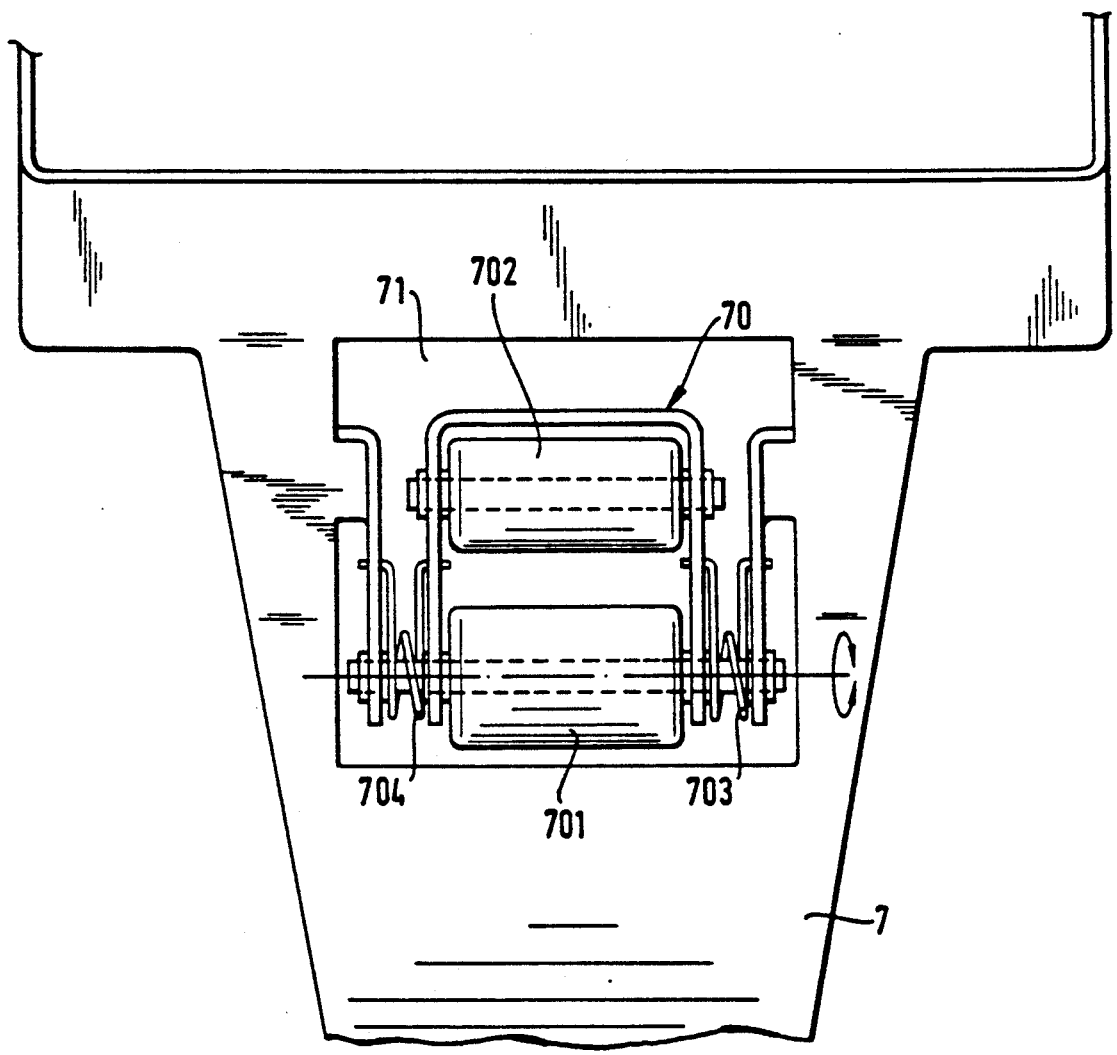
FIG. 5 shows part of the lower guide member of the cassette viewed in the direction of the arrow V in FIG. 4

FIG. 5 shows a partial view of the lower guide member 7. The view is in the direction of arrow V in FIG. 4, i.e. from the left towards the underside of the guide member 7. This partial view shows the roller component 70 again in more detail. When the cassette is in operation, the two springs 703 and 704 press the front roller 702 against the outermost layer of the wound-on strip material B and, accordingly, the strip material B against the outer wall 55 of the guide sleeve 5 or against the coil of strip material already wound round the sleeve 5. In FIG. 5 the springs 703 and 704 therefore press the front roller 702 in the direction into the plane of the drawing. By means of the guide members 6 and 7 and the roller components 60 and 70, therefore, on the one hand the strip material is guided reliably round the guide sleeve 5 and on the other hand simple mounting and dismounting of the sleeve 5 is possible simply by pivoting the guide members 6 and 7 out of the way and folding back the roller component 70. Such a cassette is comparatively simple in mechanical terms.

It has already been explained above with reference to FIG. 1 and FIG. 2 how the sleeve 5 can be pulled off the winding core 4, for example when the sleeve 5 is full. Those explanations, however, were concerned only with the mounting and dismounting of the sleeve 5. Before the cassette is operated, i.e. after mounting the sleeve 5, the cassette housing is, of course, closed completely each time and, before the (full or empty) sleeve 5 is pulled off the winding core 4, the housing must accordingly first be opened. For that purpose a threaded bolt 20 is provided which is pushed through an opening 21 in the end plate 2 that is not provided with the bearing arbor 3. The opening 21 in the end plate 2 is so arranged that the threaded bolt 20 is arranged coaxially with respect to the bearing arbor 3 of the other end plate 1 during mounting. When the cassette is closed, the threaded bolt 20 engages in a threaded bore 30 formed in the bearing arbor 3. On the side on which the end plate 2 is arranged, the threaded bolt 20 projects out of the housing and is provided at its outer end with a handle 22 which is fixed in position relative to the associated end plate 2 and is mounted so that it can be folded about an axis 23 perpendicular to the axis 201 of the threaded bolt 20. The handle 22 is in the form of a member for rotating the threaded bolt 20. In the embodiment shown in FIG. 1, the handle 22 has a substantially plate-shaped form and is mounted on a cam member 24. The cam member 24 is in such a form that the handle 22 locks stably into two different folding positions. In one folding position it is substantially parallel to the threaded bolt 20 and in the other folding position it is substantially perpendicular to the threaded bolt 20. Provided on the outside of the associated end plate 2 is a coupling plate 25 which runs parallel to the end plate 2 and is coupled to the latter under pressure, for example from the spring 251. So that the handle 22 and the coupling plate 25 can be lowered into the cassette housing when the cassette has been closed, the associated end plate 2 has a central trough-shaped recess 26. The form of the handle 22, and the form of the cam member 24, and generally the type of cassette closing mechanism described here, is sufficiently known and FIG. 1 therefore does not show an exact representation of the details of that closing mechanism.

In order to be able to couple the cassette to a copying apparatus, the former is provided with a connecting mouth 9 which projects from the light-tight casing and can be inserted into a connecting opening suitably arranged on the copying apparatus. The connecting mouth 9 is shown in FIG. 4. The strip material B coming out of the copying apparatus can be conveyed to the cassette through the connecting mouth 9. Since, owing to the dimensions of its "internal equipment", the cassette can process only certain strip material widths, there are provided in the connecting mouth 9 coding means, for example in the form of a number of permanent magnets 90, whose information can be recognised by reading means in the copying apparatus. The information may, for example, be in the form of the arrangement, the number or the orientation of those permanent magnets 90. This type of coding is sufficiently known. A more exact representation of the details of the connecting mouth 9 has therefore not been shown in FIG. 4.

As already mentioned, such a cassette, as described with reference to FIGS. 1 to 5, is especially suitable for use in photographic laboratories in conjunction with copying apparatuses that are automated to greater or lesser degree. In particular, it is suitable for use together with the Applicants' automatic copying apparatus UNISCAN. It is in principle, however, also suitable for other purposes where strip material is to be wound onto a winding core. Such a cassette is comparatively simple in mechanical terms while at the same time being operationally very reliable and easy to handle, especially during the mounting and dismounting of the guide sleeve.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A cassette for winding photographic strip material comprising:
   a housing with two opposing end plates;
   a light-tight casing for connecting said end plates wherein at least one end plate is removable from said housing to open the cassette;
   a bearing arbor securely connected to a first of said end plates;
   a drivable winding core mounted on said bearing arbor;
   a guide sleeve substantially formed as a hollow cylinder placed on said winding core;
   guide members pivotable around a common shaft and positioned around said guide sleeve to guide said photographic strip material around said guide sleeve when said photographic material is being wound onto said guide sleeve;
   means for securing said guide sleeve and said winding core into an operating position when said guide sleeve is placed onto said winding core, wherein during rotation of the winding core said guide sleeve is secured to and rotates with said winding core, said securing means further including:
   at least one pin positioned on said winding core which projects from a first end of said winding core in a substantially radially outward direction from an outer wall of said winding core;
   at least one groove in a wall of said guide sleeve for receiving said pin, said groove extending parallel to an axis of rotation of said guide sleeve from a first end of said guide sleeve into said guide sleeve by at least a distance from the first end of the winding core to the pin, said first end of said guide sleeve establishing initial contact with said winding core when said guide sleeve is slipped onto said winding core; and
   at least one ball pressure piece placed in a second end of said winding core, said ball pressure piece being locked into a groove around an inner wall of the guide sleeve proximate to a second end of the guide sleeve when said guide sleeve is slipped onto said winding core.

2. A cassette according to claim 1, wherein said at least one groove includes four grooves offset from each other by 90 degrees, each groove located in the wall at the first end of said guide sleeve and wherein two ball pressure pieces are placed in the second end of said winding core.

3. A cassette according to claim 1, wherein n pins, n being an integer, are positioned on a circumference in said first end of said winding core, each pin being offset by an angle of 360/n degrees from each adjacent pin, and wherein n grooves penetrate a wall of said guide sleeve, each groove being offset by the angle 360/n degrees from each adjacent groove, and wherein m, m being an integer, ball pressure pieces are positioned on a circumference in the second end of said winding core, each ball pressure piece being offset by an angle 360/m degrees from each adjacent ball pressure piece.

4. A cassette according to claim 1, further including:
   a plurality of O-shaped rings having a surface with a high coefficient of friction, each of said rings being inserted into one of a plurality of grooves positioned around a circumference of an outer wall of said guide sleeve.

5. A cassette according to claim 1, wherein said pivotable guide members further include:
   pressing means for pressing said strip material against an outer wall of said guide sleeve when said strip material is guided around said guide sleeve.

6. A cassette according to claim 1, wherein said pivotable guide members are positioned to form a narrow channel for the strip material, said channel extending substantially around and adjacent to said guide sleeve.

7. A cassette according to claim 6, wherein an upper guide member guides the strip material substantially around an upper half of the guide sleeve and a lower guide member guides the strip material substantially around a lower half of the guide sleeve when said upper and lower guide members are positioned in the operating position.

8. A cassette according to claim 7, wherein the upper and lower guide members are positioned along an axis which passes through the cassette from a first point on an upper half of a first side of the cassette to a second point on a lower half of another side of the cassette during a first state prior to winding the strip material.

9. A cassette according to claim 7, wherein said upper guide member further includes a roller positioned at its end facing said guide sleeve and said lower guide member further includes a pressure roller component mounted to a pivot about a shaft connected to said lower guide member, said pressure roller component further including spring means to press the strip material against the outer wall of the guide sleeve.

10. A cassette according to claim 9, wherein the roller presses the strip material approximately in the direction of said second point and the pivotable pressure component presses the strip material approximately in the direction of said first point against the outer wall of said guide sleeve when in the first state.

11. A cassette according to claim 1, further comprising:
    a threaded bolt on a second of said end plates, said bolt being positioned coaxially with respect to the bearing arbor of the first end plate and engaging said bearing arbor in a threaded bore.

12. A cassette according to claim 11, wherein said threaded bolt further includes:
    a handle for rotating said threaded bolt, said handle being positioned on an outer end of the bolt, fixed in position relative to said second end plate and mounted in position to be folded about an axis perpendicular to an axis of said threaded bolt.

13. A cassette according to claim 12, wherein said handle is substantially plate shaped and is mounted on a cam member for locking said handle into two different holding positions, a first position being substantially parallel to the threaded bolt and a second position being substantially perpendicular to the threaded bolt.

14. A cassette according to claim 13, wherein a coupling plate outside said second end plate runs parallel to said second end plate and is coupled to said second end plate under pressure from a spring means.

15. A cassette according to claim 14, wherein said second end plate has a central-trough shaped recess for accommodating said coupling plate and into which said handle can be lowered.

16. A cassette according to claim 1, further including:
a connecting mouth projecting from the casing for insertion into a connecting opening on a copying apparatus when said cassette is coupled to said copying apparatus and through which said strip material from said copying apparatus can be conveyed to said cassette, and coding means on said connecting mouth containing information concerning a width of the strip material which can be processed by said cassette, said information being intelligible to said copying apparatus.

17. A cassette according to claim 16, wherein said coding means further includes a plurality of permanent magnets, said information being in a form of an arrangement of and orientation of said permanent magnets.

18. A cassette for winding photographic strip material comprising:
a light-tight casing;
a bearing arbor securely connected within said light-tight casing;
a drivable winding core mounted on said bearing arbor;
a guide sleeve substantially formed as a hollow cylinder placed on said winding core;
means for securing said guide sleeve and said winding core when said guide sleeve is placed onto said winding core, wherein during rotation of the winding core said guide sleeve is secured to and rotates with said winding core, said securing means further including:
at least one pin positioned on said winding core which projects from a first end of said winding core in a substantially radially outward direction from an outer wall of said winding core;
at least one groove in a wall of said guide sleeve for receiving said pin, said groove extending parallel to an axis of rotation of said guide sleeve from a first end of said guide sleeve into said guide sleeve by at least a distance from the first end of the winding core to the pin, said first end of said guide sleeve establishing initial contact with said winding core when said guide sleeve is slipped onto said winding core; and
at least one ball pressure piece placed in a second end of said winding core, said ball pressure piece being locked into a groove around an inner wall of the guide sleeve proximate to a second end of the guide sleeve when said guide sleeve is slipped onto said winding core.

19. A cassette according to claim 18, wherein said at least one groove includes four grooves offset from each other by 90 degrees, each groove located in the wall at the first end of said guide sleeve and wherein two ball pressure pieces are placed in the second end of said winding core.

20. A cassette for winding photographic strip material comprising:
a housing with two opposing end plates;
a light-tight casing for connecting said end plates wherein at least one end plate is removable from said housing to open the cassette;
a bearing arbor securely connected to a first of said end plates;
a drivable winding core mounted on said bearing arbor;
a guide sleeve substantially formed as a hollow cylinder placed on said winding core;
guide members pivotable around a common shaft and positioned around said guide sleeve to guide said photographic strip material around said guide sleeve when said photographic material is being wound onto said guide sleeve;
means for securing said guide sleeve and said winding core into an operating position when said guide sleeve is placed onto said winding core, wherein during rotation of the winding core said guide sleeve is secured to and rotates with said winding core; and
wherein said pivotable guide members are positioned to form a narrow channel for the strip material, said channel extending substantially around and adjacent to said guide sleeve.

* * * * *